2,958,632

PROCESS FOR RECOVERY OF HIGHLY ACTIVE, STABLE, SUBSTANTIALLY STERILE, SOLUBLE, PROTEOLYTIC, ENZYME COMPOSITION FROM COMMERCIAL CRUDE PAPAIN

David R. Schwarz, Mamaroneck, and Ralph C. Golyzniak, Wantaugh, N.Y., assignors to Schwarz Laboratories, Inc., Mount Vernon, N.Y., a corporation of New York No Drawing. Filed Dec. 28, 1955, Ser. No. 555,756

6 Claims. (Cl. 195—68)

This invention relates to the preparation of a soluble enzyme composition having exceptionally high proteolytic activity and improved stability and purity.

As conductive to a clear understanding of the invention, it is noted that papain is a vegetable enzyme obtained by collecting and drying the exudate formed by the fruit of Carica papaya after shallow incisions through the skin of the fruit. Papaya plants are cultivated for papain production principally in tropical and sub-tropical areas of the world where unskilled labor and relatively cheap land is available.

In such conventional collecting procedure, the exudate forms soft cream-colored curds which are spread on trays made of cloth or leaves and dried either in the sun or in wood-fired kilns or drying huts of simple construction. The dried granules so obtained are known in the trade as crude papain. Variations in handling result in wide variations in the enzymatic activity, color, odor, and purity of the finished product, which is then sold as commercial crude papain of various grade, the value of which is based on activity, lightness of color, and general purity.

As papain is grown, harvested and dried largely on many small farms and plantations, it is not practical to install the necessary equipment and controls which might help to avoid deterioration during processing such as: loss of activity, darkening in color, development of strong characteristic odor, contamination by insects, microorganisms and foreign matter, and denaturation of protein constituents, all of which cause substantial loss in the utility of the dried crude papain. Furthermore, these crude papains are generally rather unstable on storage, losing as much as 50 percent of the enzymatic activity contained in the freshly dried material within a few month's storage at ordinary temperature. The enzymes are even more rapidly inactivated at higher temperatures.

The chief industrial utility of papain resides in its powerful protein digesting enzymes. The enzyme activity is commonly determined by measuring the rate of protein degradation produced by a given amount of papain. Methods have been published using casein, gelatin, hemoglobin, milk, and meat powder for this purpose. More exact comparisons among samples can be made when the activity is reported in terms of the number of peptide bonds hydrolyzed per given weight of papain in a fixed time under specified conditions.

It is among the objects of this invention to provide a simple and economical procedure for recovering from crude commercial papain, however previously processed, an industrial enzyme of much enhanced proteolytic activity, that is, one wherein most, if not all, of the activity lost during harvesting and drying is recovered and the resultant product is of improved color, solubility, odor and keeping qualities. The procedure is of special value in the enhancement of low grade papains but it is also fully effective when applied to dried papain of the highest quality, as will be noted in the examples given hereinafter.

Another object is the preparation of an enzyme composition from crude commercial papain which is substantially sterile, substantially free from the water insoluble waxy substances naturally occurring in such crudes as well as from insoluble denatured proteins, foreign matter, and enzyme inhibitors which frequently exist in crude commercial papain, either as a result of processing or of agricultural conditions.

Another object is the preparation, from crude commercial papain, of a finely powdered dry, stable, soluble, highly active enzyme composition without resort to grinding or milling at any stage of the processing, thus saving the expense and material losses inherent in the grinding operation.

The invention makes possible for the first time, the economical preparation on a large scale, from crude papain, of a highly active proteolytic enzyme composition which is substantially sterile and therefore much more suitable for many pharmaceutical and food applications than commercial papain.

Where it is attempted to enhance the relatively low proteolytic activity of suspensions of crude papain in water by the addition of reducing agents such as potassium cyanide, hydrogen sulfite or sodium or potassium bisulfite, metal bisulfite or cystine, the thus treated suspension must be applied promptly to the material to be proteolyzed if the enhanced activity is not to be lost. The same limitation applies where it is attempted to check the inactivation of the enzyme due to the presence of traces of heavy metals, by chelation, utilizing for the purpose ethylene diamine tetracetic acid or the like in the effort to increase the proteolytic activity of the suspension. The attempt to preserve the proteolytic activity of Garcia papaya by treating the fresh exudate with bisulfites, on the numerous small plantations where the papaya grows, entails difficulties due to the unavailability of equipment and skilled labor, and moreover does not prevent subsequent losses in proteolytic activity during drying under the conditions normally available in these areas.

We have discovered the surprising fact that dried crude commercial papain which has already lost for all practical purposes a significant part of the activity originally present in the exudate, can be reactivated and rendered stable by a simple extraction with certain reagents followed by spray drying of the extract. The drying procedure is best carried out at temperatures so high as would be expected to inactivate most enzymes and which are made possible by the method of extraction and drying disclosed. The final step of the extraction process is performed in manner to remove practically all insoluble and inactive material, enzyme inhibitors and other impurities. The high temperatures preferably used in spray drying result in a substantially sterile product. The dry powder thus produced consists of spherical particles ranging in diameter from 0.2 to 2 microns and needs no further treatment for commercial application. This soluble enzyme powder is far more stable than the crude commercial papain from which it is prepared and loses at most only a few per cent of its activity during prolonged storage at room temperature.

The papain extracts are made by mixing crude unground commercial papain with water containing a compound which provides from 1 to 4 percent by weight of available $SO_2$ (added as $H_2SO_3$, $NaHSO_3$ or other salt of $SO_3$), which water also contains 0.5 to 3 percent of a chelating agent that is desirably ethylene diamine tetraacetic acid, phytic acid, citric acid or their salts. The ratio of crude papain to extracting solution may vary widely; however, the greatest economy and efficiency is obtained when the weight ratio is between 0.1 to 0.5, generally between 0.3 to 0.5. Above the upper limit of crude papain the extract slurry is generally too thick to be handled efficiently in usual processing equipment, while extracts less concentrated than the minimum may be uneconomical to dry.

The time required for extraction is not critical, but at least two hours is generally required to disintegrate the granules of crude papain completely and to solubilize the active enzyme. As the extract is very stable it may be held in this condition at room temperature for days or even several weeks without loss. To assure complete extraction in large scale batches, an extraction period of 8 to 16 hours (over-night) is generally preferred. The extraction may be carried out at any temperature between the freezing point of the extract (about 28° F.) and 150° F., but it is most economical, and therefore preferred, to operate at room temperature, that is, between 60 and 90° F.

The pH of the extract may be between 4.5 and 7.0, preferably between 5.0 and 6.0. The normal pH of the extract when using the conditions disclosed, falls within this range and, therefore, generally no special adjustment of pH is necessary, but any adjustment that might be required occasionally is effected in conventional manner by adding alkali (say NaOH) or acid, say (HCl) in proportions required.

At the end of the extraction period, diatomaceous filter aid is added to the extract slurry and it is filtered on a filter press, to remove the insoluble materials and the clear filtrate is collected. The filter cake is washed with solution of the same composition as the solution used for the original extraction, and the washings combined with the filtrate.

A clear extract may also be obtained by centrifugation, but this may complicate the mechanics of washing residual activity from the solids.

The clear extract may contain from 10 to 40 percent solids by weight, the preferred concentration being 18 to 35 percent. Solutions of this concentration will have a specific gravity of from about 1.08 to about 1.14, exhibit very little increase in viscosity as compared with water, are relatively non-foaming and are readily pumped.

The extract is fed to a spray dryer through a nozzle or centrifugal spinner, dried in a blast of hot air and the dried particles collected in a cyclone or other dust collector. The temperature of the air blast may be as high as 600° F. without deleterious effect on the activity of the dried product, the preferred temperature range being 320° to 450° F.

The following comparison of the composition of typical crude commercial papain and the product obtained therefrom according to the present invention, shows the basis for one improvement effected by our invention:

|  | Crude Papain, parts | Soluble Enzyme Product, parts |
|---|---|---|
| Moisture | 5-10 | 4-6 |
| Protein (N×6.25 dry basis) | 58-65 | 70-80 |
| Ether extractables (wax) | 8-15 | 0-3 |
| Water insolubles | 10-25 | 0-1 |

Table I illustrates the increases in specific activity which can be achieved with various grades of crude commercial papain. With relatively low grades of crude commercial papain, the increase in specific activity varies from 2 to nearly 4 fold, whereas with higher grades, the higher initial activity is increased in specific activity between 1.5 and 2 fold.

Table I

| Sample No. | Activity in units [1] per gram | | Ratio of Increase | Wt. Yield | Yield Factor (2)×(3) |
|---|---|---|---|---|---|
|  | Crude (1a) | Product (1b) | (2) | (3) | (4) |
| 1 | 34 | 124 | 3.6 | .57 | 2.06 |
| 2 | 55 | 154 | 2.8 | .63 | 1.76 |
| 3 | 70 | 155 | 2.2 | .61 | 1.35 |
| 4 | 71 | 191 | 2.7 | .56 | 1.51 |
| 5 | 75 | 144 | 1.9 | .70 | 1.33 |
| 6 | 80 | 144 | 1.8 | .72 | 1.29 |
| 7 | 88 | 179 | 2.0 | .60 | 1.20 |

[1] A unit is defined as the release of one milliequivalent of $NH_2$ from the peptide bonds of gelatin in one hour at 40° C. and pH 5.0 as measured by formol titration with a 3.3% gelatin solution.

While the foregoing table covers the most common range of crude commercial papain in various degrees of efficacy and of the resultant soluble enzyme product, the actual range of proteolytic activity of the crude papain is frequently as low as 30 units or lower, and as high as 100 or higher, and the proteolytic activity of the soluble enzyme product may be as low as 110 units, and as high as 200 units or more.

Table II illustrates the improvement in stability of the product prepared according to our invention as compared with the stability of a commercial crude papain of exceptionally high initial activity.

Table II

|  | Initial Activity, units/gram | Date | After Storage, units/gram | Date | Months Elapsed | Percent Loss |
|---|---|---|---|---|---|---|
| Commercial Crude Papain: |  |  |  |  |  |  |
| Sample MV1721 | 136 | 10/21/54 | 81 | 3/30/55 | 5.3 | 41 |
| Sample MV1758 | 116 | 11/24/54 | 85 | 3/30/55 | 4.2 | 28 |
| Papain Processed according to the invention: |  |  |  |  |  |  |
| Sample MV1742-3 | 177 | 11/3/54 | 173 | 3/15/55 | 4.4 | 2 |
| Sample MV1710-A8 | 181 | 10/7/54 | 179 | 3/16/55 | 5.4 | 1 |
| Sample MV1710-A10 | 207 | 10/7/54 | 203 | 3/15/55 | 5.4 | 2 |

All stored at room temperature in tightly sealed bottles under same conditions.

A comparison of the bacterial count of crude papain with that treated according to the invention, where the spray dried product is not guarded against air-borne contamination follows in Table III.

Table III

COMPARISON OF BACTERIAL COUNTS CRUDE AND TREATED PAPAIN (dilutions 1:100)

| Test | Bacterial Count/Gram | |
|---|---|---|
|  | Crude | Treated |
| Standard Nutrient Agar, 96 hrs. at 37° C | 440,000 | 5,700 |
| Malt Extract Agar, 96 hrs. at 28° C | 370,000 | 900 |
| Malt Extract Broth, 96 hrs. at 28° C | heavy growth | no growth |

The invention thus provides a surprising result of great economic value; not only is the specific proteolytic activity increased markedly, usually between 1.8 and 2.5 fold, but also, the total activity recovered (weight yield×specific activity) is considerably greater than the amount available in the original crude papain. The total recovery may be 200 percent or more, but is more usually between 120 and 150 percent or more, as shown in Table I. Thus the invention provides a means for substantially upgrading the material with little or no net ecomonic cost, and the product is substantially sterile, and if protected from air-borne contamination after spray drying will be absolutely sterile.

Although the foregoing description is considered to be adequate to teach those skilled in the art how to practice the invention, a number of specific illustrative examples follow to assure full compliance with the statutory requirements.

EXAMPLE I 500 lbs. of crude commercial papain testing 80 units per gram, is added to 150 gallons (1250 lbs.) of water to which 37.5 lbs. of commercial $NaHSO_3$ and 14.25 lbs. of Versene 9 (sodium salt of ethylene diamine tetra acetic acid) has been previously added. The slurry is stirred for two hours at room temperature. Then 50 lbs of Hyflo supercel (diatomaceous filter aid) is added and the slurry filtered through a plate and frame filter press. The clear filtrate and about 50 gallons of wash are collected together in a suitable tank. The total volume at this point is 165 gallons. This solution has a solids content of 27 percent by weight and specific gravity of 1.12. It is sprayed into a drying chamber through a nozzle into an air stream at 325° F. and collected in a cyclone collector attached to the outlet of the chamber. 360 lbs. of dry product having an activity of 142 units per gram is recovered: Activity X weight provides a yield of $$\frac{360 \times 142}{500 \times 80} \times 100 = 127.8 \text{ percent}$$

EXAMPLE II 500 lbs. of crude commercial papain having a specific activity of 50 is added to 120 gallons (1000 lbs.) of water to which has been added, previously, 30 lbs. of $NaHSO_3$ and 10 lbs. of sodium phytate. The solution is stirred for 14 hours at 25° C. and then 40 lbs. of diatomaceous earth is added. The extract is filtered and spray dried as described in Example I. The product weighs 330 lbs. and has an activity of 110 units/gram. Activity X weight provides a yield of 145 percent.

EXAMPLE III 600 lbs. of crude commercial papain having a specific activity of 50 is added to 180 gallons (1500 lbs.) of water containing 18 lbs. of calcium phytate and 50 lbs. of $NaHSO_3$ and stirred for 18 hours at room temperature. Fifty pounds of Celite 505 (diatomaceous filter aid) is added and the extract filtered in a plate and frame press. The residual cake is washed with 60 gallons of water containing 6 lbs. of calcium phytate and 16 lbs. of $NaHSO_3$. The clear filtrate and washings are mixed and fed to a spray dryer as in Example I. The product weighs 425 lbs. and has a specific activity of 115 units per gram. Activity X weight provides a yield of 163 percent.

EXAMPLE IV 20 lbs. of crude papain having an activity of 70 units per gram is mixed with 4.75 gallons (about 40 lbs.) of water to which has been added 1.12 lbs. of $NaHSO_3$ and .38 lbs. of Versene 9. After 2 hours stirring at 120° F., 2 lbs. of Celite 505 is added, and the slurry is filtered by suction. The cake is washed with one gallon of water. The combined filtrate and wash is fed to a spray dryer through a centrifugal atomizer, dried in a blast of air heated to 600° F., and collected by a cyclone separator. The product weighs 13.7 lbs. and has an activity of 126 units/gram. Activity X weight provides a yield of 123 percent.

EXAMPLE V 10 lbs. of crude papain having an activity of 100 units per gram is stirred in 3.5 gallons (about 30 lbs.) of water containing .6 pounds of sodium citrate and 1.2 pounds of potassium metabisulfite at 130° F. for 3 hours. One pound of diatomaceous filter aid is added, and the slurry is filtered by suction. The cake is washed with 4 pounds of water (about ½ gallon) and the wash combined with the filtrate, which is then fed to a spray dryer through a centrifugal atomizer as described in Example IV, but with an air temperature of 350° F. The product weighs 8.3 pounds and has an activity of 160 units/gram. Activity X weight provides a yield of 133 percent.

As many changes could be made in the above process and product, and many apparently widely different embodiments of this invention could be made without departing from the scope of the claims, it is intended that all matter contained in the above description shall be interpreted as illustrative and not in a limiting sense.

Having thus described our invention, what we claim as new and desire to secure by Letters Patent of the United States is:

1. The process for recovering a highly active stable, substantially sterile, soluble, proteolytic enzyme composition from commercial crude papain which comprises extracting the crude papain with an aqueous solution containing 1 to 4 percent available $SO_2$ and 0.5 to 3 percent of a chelating agent, selected from the group consisting of ethylene diamine tetra acetic acid, phytic acid, citric acid and their respective salts and spray drying the clarified extract into a blast of air heated to between 250° and 600° F.

2. The process for recovering a highly active, stable, substantially sterile, soluble, proteolytic enzyme composition from commercial crude papain which comprises extracting the crude papain with an aqueous solution containing 1 to 4 percent of available $SO_2$ and 0.5 to 3 percent of a chelating agent selected from the group consisting of ethylene diamine tetra acetic acid, phytic acid, citric acid and their respective salts, clarifying the extract and recovering the solids therefrom by spraying the clarified extract into a blast of air heated to between 250 and 600° F.

3. The combination recited in claim 2 in which the clarifying step is effected by filtration, which filtration withdraws from the extract substantially all insoluble waxy substances naturally occurring in the crude commercial papain as well as insoluble denatured proteins, foreign matter and enzyme inhibitors commonly present in such papain.

4. The process recited in claim 2 in which the extract is prepared at temperatures between 60° and 90° F.

5. The process recited in claim 2 in which the pH of the extract solution is between 4.5 and 7 and its specific gravity is between 1.09 and 1.14.

6. The process recited in claim 2 in which the pH of the extract solution is between 5.0 and 6.0 and its specific gravity is between 1.08 and 1.14.

References Cited in the file of this patent

UNITED STATES PATENTS

| | | |
|---|---|---|
| 1,474,381 | Rogers | Nov. 20, 1923 |
| 1,826,467 | Harteneck | Oct. 6, 1931 |
| 2,095,300 | Wallerstein | Oct. 12, 1937 |
| 2,219,209 | Neufeld | Oct. 22, 1940 |
| 2,464,200 | Hall | Mar. 15, 1949 |
| 2,676,138 | Hinkel | Apr. 20, 1954 |
| 2,773,002 | Connors et al. | Dec. 4, 1956 |

OTHER REFERENCES

Chemistry & Technology of Enzymes by Tauber, 1949, publ. by John Wiley and Sons (New York), pp. 160 to 163.

Methods in Enzymology by Colowick & Kaplan, 1955, publ. by Academic Press Inc. (New York), pp. 29 to 31 of vol. 1.

Balls and Lineweaver; J. Biol. Chem., vol. 130, pp. 670 to 672.